United States Patent
Brewer et al.

(10) Patent No.: US 9,517,839 B2
(45) Date of Patent: Dec. 13, 2016

(54) ELECTROMECHANICAL LINEAR ACTUATOR FOR IN BLADE ROTOR CONTROL

(71) Applicant: Claverham LTD., Bristol (GB)

(72) Inventors: Paul R. Brewer, Bristol (GB); Suat Bekircan, Bath (GB)

(73) Assignee: CLAVERHAM LTD., Bristol (GB)

( * ) Notice: Subject to any disclaimer, the term of this patent is extended or adjusted under 35 U.S.C. 154(b) by 828 days.

(21) Appl. No.: 13/948,817

(22) Filed: Jul. 23, 2013

(65) Prior Publication Data
US 2014/0064962 A1 Mar. 6, 2014

(51) Int. Cl.
*B64C 27/615* (2006.01)
*B64C 27/72* (2006.01)

(52) U.S. Cl.
CPC ............. *B64C 27/615* (2013.01); *B64C 27/72* (2013.01); *B64C 2027/7266* (2013.01); *Y02T 50/34* (2013.01)

(58) Field of Classification Search
None
See application file for complete search history.

(56) References Cited

U.S. PATENT DOCUMENTS

| | | | |
|---|---|---|---|
| 4,888,122 A * | 12/1989 | McCready | C10M 161/00 508/165 |
| 5,387,083 A * | 2/1995 | Larson | B64C 27/615 416/23 |
| 6,109,870 A | 8/2000 | Yamakawa et al. | |
| 6,152,692 A * | 11/2000 | Aubry | B64C 27/615 244/17.25 |
| 6,499,690 B1 | 12/2002 | Katayama et al. | |
| 6,827,310 B1 * | 12/2004 | Whitham | B64C 9/02 244/3.24 |
| 7,677,868 B2 * | 3/2010 | Chaudhry | B64C 27/615 310/54 |
| 2005/0178927 A1 | 8/2005 | Breuer et al. | |
| 2008/0138203 A1 | 6/2008 | Collins et al. | |

OTHER PUBLICATIONS

Notification of Transmittal of the European Search Report and the Written Opinion of the European Searching Authority; 12250147.1; Mailed Feb. 8, 2013; European Patent Office; 6 pages.

* cited by examiner

*Primary Examiner* — Igor Kershteyn
*Assistant Examiner* — Justin Seabe
(74) *Attorney, Agent, or Firm* — Cantor Colburn LLP

(57) ABSTRACT

A rotor blade assembly includes a rotor blade and a movable trim tab located along a span of the rotor blade. A linear positioner is located inside the rotor blade and operably connected to the trim tab to move the trim tab thereby reducing rotor blade vibration. A method for reducing vibration of a rotor assembly includes energizing a linear positioner located inside a rotor blade of the rotor assembly and moving an output piston of the linear positioner. A trim tab located at the rotor blade is moved to a selected trim tab angle relative to the rotor blade by the output piston, and the linear positioner is deenergized thereby locking the trim tab at the selected trim tab angle.

12 Claims, 6 Drawing Sheets

ELECTROMECHANICAL LINEAR ACTUATOR FOR IN BLADE ROTOR CONTROL

FEDERAL RESEARCH STATEMENT

This invention was made with government support under contract number IDWA 2701436 awarded by the U.S. Army. The government has certain rights in the invention.

BACKGROUND OF THE INVENTION

The subject matter disclosed herein relates to rotary-winged aircraft. More specifically, the subject matter disclosed herein relates to actuation of control surfaces of rotary-winged aircraft rotor blades.

Manufacturing and assembly tolerances of rotors for, for example, rotary-winged aircraft such as helicopters, are often such that the resulting rotor is not balanced either in terms of weight, or lift produced by the rotor blades. The imbalance manifests itself in undesirable vibration and/or noise under certain flight conditions. Such issues also occur in other rotor applications, such as those for wind turbines. To mitigate the vibration issues, typically rotor blades are selectively weighted or trim tabs located at a trailing edge of the rotor blades are adjusted to balance the rotor. Trim tabs are bendable or movable portions of the rotor blade trailing edge and are typically bent upwards or downwards by ground maintenance personnel utilizing gages and tools to adjust position of the trim tab to reduce or eliminate the vibration. Such methods of adjustment are time consuming and cumbersome, and as stated, are only performed on the ground by maintenance personnel.

BRIEF DESCRIPTION OF THE INVENTION

In one embodiment, a rotor blade assembly includes a rotor blade and a movable trim tab located along a span of the rotor blade. A linear positioner is located inside the rotor blade and operably connected to the trim tab to move the trim tab thereby reducing rotor blade vibration.

In another embodiment, a rotary-winged aircraft includes an airframe and a main rotor assembly operably connected to the airframe. The main rotor assembly includes a plurality of rotor blade assemblies rotatable about a rotor assembly axis, at least one rotor blade assembly of the plurality of rotor blade assemblies including a rotor blade and a movable trim tab located along a span of the rotor blade. A linear positioner is located inside the rotor blade and operably connected to the trim tab to move the trim tab thereby reducing rotor blade vibration.

In yet another embodiment, a method for reducing vibration of a rotor assembly includes energizing a linear positioner located inside a rotor blade of the rotor assembly and moving an output piston of the linear positioner. A trim tab located at the rotor blade is moved to a selected trim tab angle relative to the rotor blade by the output piston, and the linear positioner is deenergized thereby locking the trim tab at the selected trim tab angle.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
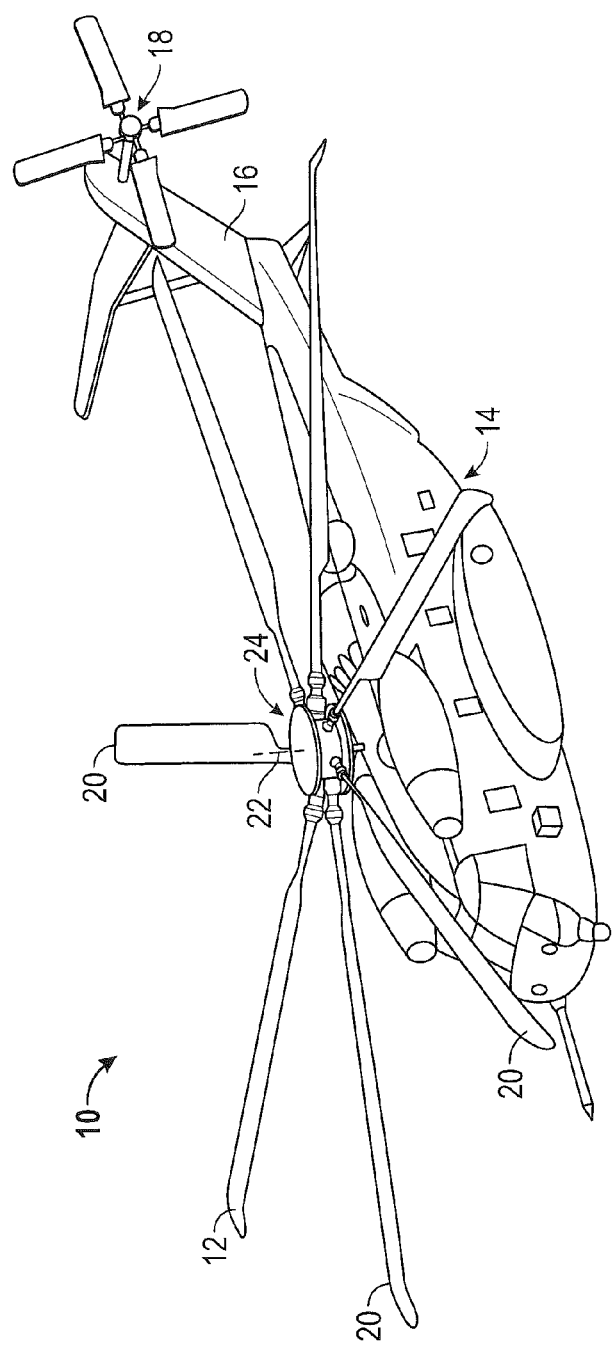
FIG. 1 is a schematic illustration of an embodiment of a rotary-winged aircraft.

The detailed description explains embodiments of the invention, together with advantages and features, by way of example with reference to the drawing.

DETAILED DESCRIPTION OF THE INVENTION

Shown in FIG. 1 is a schematic of a rotary wing aircraft, in this embodiment, a helicopter 10. The helicopter 10 includes a main rotor assembly 12, and an airframe 14 having an extending tail 16 at which is mounted an anti-torque rotor 18. Although the aircraft illustrated is a helicopter 10, it is to be appreciated that other machines, such as turbo props or tilt-rotor aircraft or coaxial or tandem rotor helicopters or other structures such as wind turbine blades may also benefit from the system of the present disclosure. The main rotor assembly 12 includes a plurality of rotor blades 20 located about a rotor axis 22 via a rotor hub assembly 24. Further, it is to be appreciated that the rotor blade 20 configurations described herein may be applied to other rotor assemblies, such as those for wind turbines.

Figure 2:
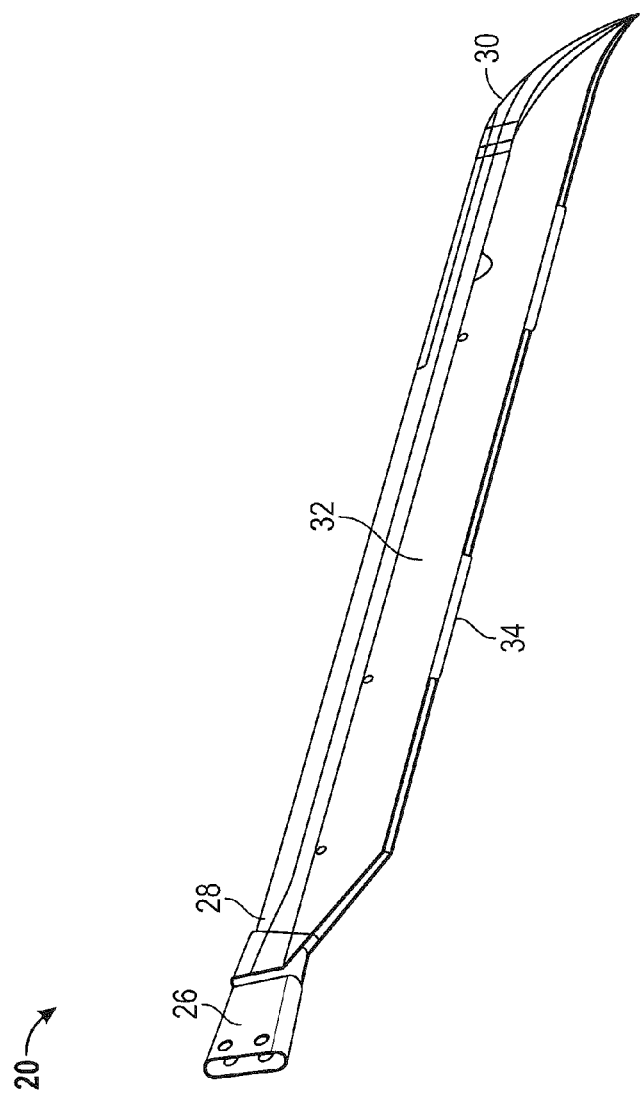
FIG. 2 is a schematic illustration of an embodiment of a rotor blade assembly for a rotary-winged aircraft.

Referring now to FIG. 2, each rotor blade 20 extends from a blade cuff 26, at which the rotor blade 20 is secured to the hub assembly 24 (best shown in FIG. 1). The rotor blade 20 includes a root section 28 nearest the blade cuff 26 and a tip section 30 at a most radially outboard portion of the rotor blade 20. A midspan section 32 is located between the root section 28 and the tip section 30. Each rotor blade 20 section may be further defined by particular airfoil shapes or geometries to result in desired aerodynamic properties and performance of each section, and the rotor blade 20 as a whole. When the rotor blade 20 is rotated about the rotor axis 22, a centrifugal force acting outwardly toward the rotor blade tip section 30 is imparted on the rotor blade and its components.

Figure 3:
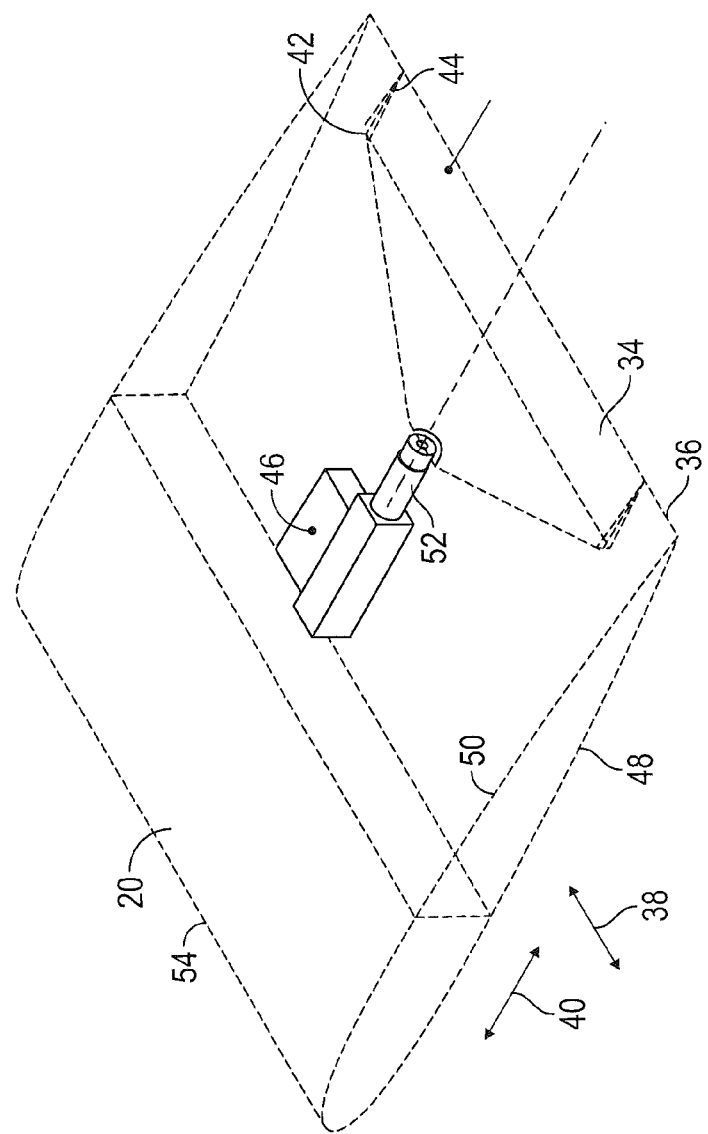
FIG. 3 is a schematic illustration of an embodiment of a trim tab and linear positioner arrangement of rotor blade assembly for a rotary-winged aircraft.

Referring to FIGS. 2 and 3, the rotor blade 20 includes one or more trim tabs 34 located at a trailing edge 36 of the rotor blade 20. The trim tabs 34 extend at least partially along the rotor blade 20 in a spanwise direction 38 and at least partially into the rotor blade 20 in a chordwise direction 40. The trim tabs 34 are movable about a pivot axis 42 that extends along the spanwise direction 38. To position the trim tab 34 at a selected trim tab angle 44, a linear positioner 46 is operably connected to the trim tab 34 and located between a pressure side 48 and a suction side 50 of the rotor blade 20. Such a linear positioner is suitable for use in high "g" environments, in some embodiments up to about 750 g. The linear positioner 46 includes an output piston 52 that translates in the chordwise direction 40 and, via connection to trim tab 34, urges rotation of the trim tab 34 about the pivot axis 42. Alternatively, the output piston 52 may translate in the spanwise direction 38 and is connected to the trim tab 34 via a bell crank or other linkage arrangement. To alter the position of the trim tab 34 to reduce vibration caused by, for example, rotor imbalance or certain flight conditions, the linear positioner 46 is energized. The output piston 52 translates chordwise, either toward the trailing edge 36 or toward a leading edge 54 of the rotor blade 20. This results in the trim tab 34 pivoting about the pivot axis 42 to the selected trim tab angle 44. When the selected trim tab angle 44 is achieved, the linear positioner 46 may be de-powered, thus locking position of the trim tab 34. As will be described in more detail below, such adjustment of the trim tab 34 position may be accomplished via pilot input during flight, not only during ground maintenance operations as with prior art systems.

Figure 4:
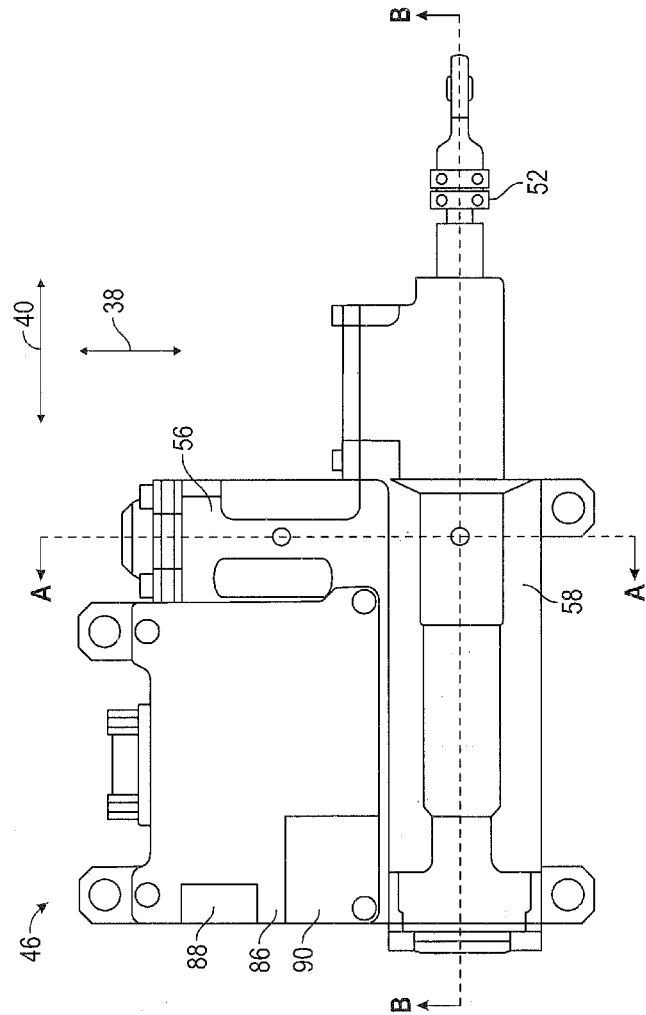
FIG. 4 is a plan view of an embodiment of a linear positioner of a rotor blade assembly.
Figure 5:
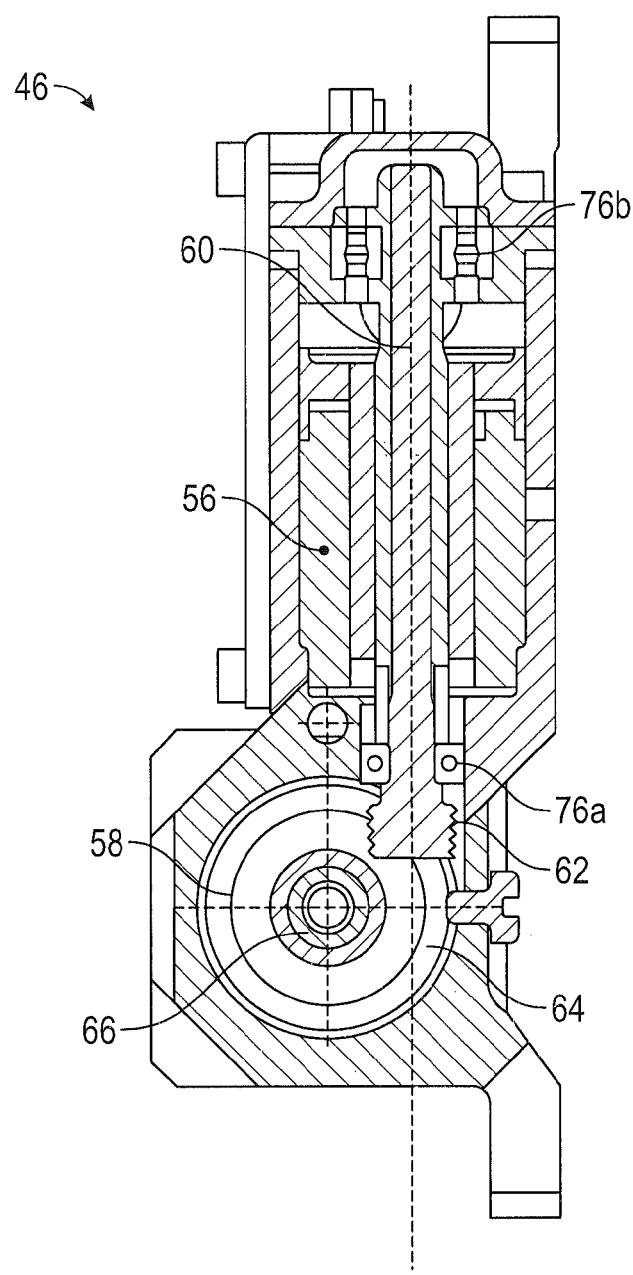
FIG. 5 is a cross-sectional view A-A of the embodiment of a linear positioner of FIG. 4.
Figure 6:
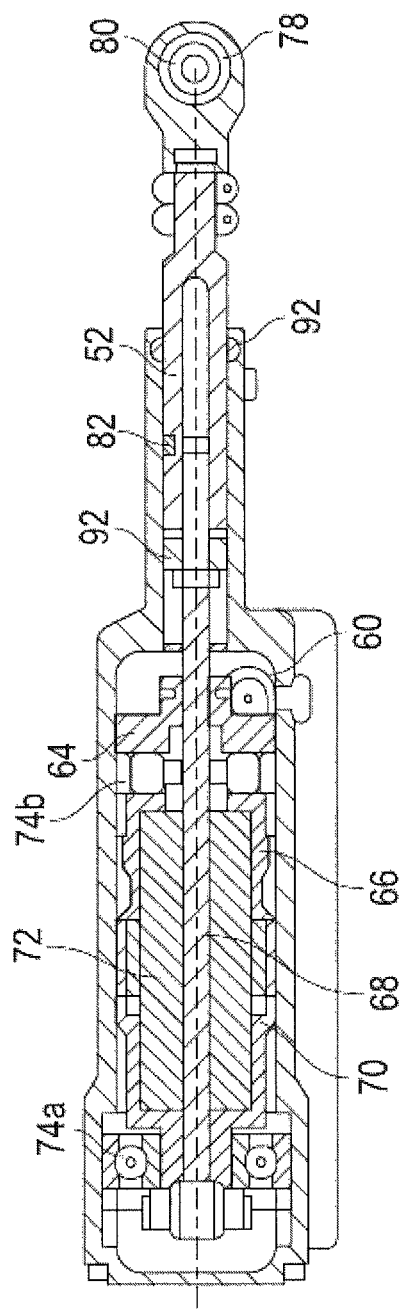
FIG. 6 is a cross-sectional view B-B of the embodiment of a linear positioner of FIG. 4.

Referring now to FIG. 4-6, the linear positioner 46 is shown in more detail. The linear positioner 46 includes an electric motor 56, in some embodiments, a high power density brushless DC motor. The motor 56 is operably connected to, and drives a gear assembly 58, which is, in turn, connected to a planetary roller screw nut 70, which drives the output piston 52. As shown, the motor 56 is oriented transverse to the output piston 52, or in the spanwise direction 38. Referring to FIG. 5, a cross-sectional view through a portion of the linear positioner 46 is shown. The motor 56 includes a motor shaft 60 extending therethrough. The motor shaft 60 includes a plurality of motor shaft gear teeth 62 that mesh with a reduction gear 64 of the gear assembly 58. In some embodiments, as shown, the reduction gear 64 is a high single reduction spiral drive, worm gear or bevel gear 64. It provides continuously meshing teeth resulting in smooth power transfer and efficient transmission of load from the motor shaft 60, with a gear ratio sufficient to prevent back drive of the output piston 52. Referring to FIG. 6, the reduction gear 64 drives a planetary roller nut 70. Threaded rollers 72 between a screw shaft 68 and the planetary roller nut 70 comprise the load bearing elements of a rollerscrew 66 assembly. The use of the threaded rollers 72 result in an increased number of contact points enabling the rollerscrew 66 assembly to support high loads. To increase wear resistance of the threaded rollers 72, a lubricant such as oil, grease, or dry lubricant may be utilized. Further, the rollers 72 may be constructed of one or more self-lubricating materials. The rollers 72 contact the planetary roller nut 70 and screw shaft 68 threads, thus transferring lubricant thereto.

The planetary roller nut 70 and the reduction gear 64 are supported by a set of bearings 74. In some embodiments, the bearings 74 are deep groove ball bearings. A first bearing 74a is located axially along the planetary roller nut 70 to carry actuator thrust loads and radial loads, while a second bearing 74b is free to move axially along the housing bore and carries radial loads. The screw shaft 68 is fitted with an anti-rotation device so as the planetary roller nut 70 is rotated by operation of the motor 56, the rotation is translated into linear motion of the screw shaft 68 and the output piston 52. Referring again to FIG. 5, the motor 56 includes motor bearings 76 to support the motor shaft 60. The motor bearings are also deep groove ball bearings, in some embodiments. In some embodiments, the bearings 74 and motor bearings 76 are constructed using ceramic or steel balls or rollers, and solid lubricant impregnated separators. It is to be appreciated, however, that in other embodiments other materials may be utilized for construction of the bearings 74 and motor bearings 76.

Referring again to FIG. 6, the screw shaft 68 is connected to the output piston 52 including a shaft eye 78 that moves linearly when driven by linear motion of the screw shaft 68. In some embodiments, the output piston 52 is coated with a hard facing matrix impregnated with appropriate dry lubricant. The output piston 52 is supported by two dry lubricated linear bearings 92. In some embodiments, the shaft eye 78 includes a spherical bearing 80 to connect to the trim tab 34 while accommodating misalignment between the trim tab 34 and the linear positioner 46. The output piston 52 includes a magnet 82 for determining a travel limit and end stops of the shaft eye 78 movement. The magnet 82 operates Hall effect switches or other proximity switches (not shown) that are connected to an electronic controller 86 (shown best in FIG. 4) controlling operation of the linear positioner 46 via control of the electric motor 56.

Referring to FIG. 4, the controller 86 includes serial connection 88 to an aircraft control system (not shown) and/or wireless connectivity thereto. Connection to the aircraft control system allows for adjustment of the trim tab 34 by the pilot or operator, even during flight. In some embodiments, the adjustment of the trim tab 34 position may occur automatically, triggered by, for example, a vibration sensor (not shown).

Referring again to FIGS. 5 and 6, to adjust the trim tab 34, the electric motor 56 is energized by a power connection to the airframe 14, or by a battery 90 located at, for example, the controller 86. Power to the electric motor 56 drives rotation of the motor shaft 60, which in turn drives the screw shaft 68 linearly via the reduction gear 64. Rotation of the planetary roller nut 70 translates into linear motion of the screw shaft 68, output shaft 52 and the shaft eye 78. The linear motion drives rotation of the trim tab 34 about the pivot axis 42 to the selected trim tab angle 44. When the selected trim tab angle 44 is achieved, the controller 86 is deenergized, and the position of the trim tab 34 is locked via the gear mesh between the motor shaft 60 and the reduction gear 64. In high vibration environments, other locking mechanisms may be utilized, such as magnetic devices, brakes or clutches.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A rotor blade assembly comprising:
   a rotor blade;
   a movable trim tab disposed along a span of the rotor blade; and
   a linear positioner disposed inside the rotor blade and operably connected to the trim tab to move the trim tab thereby reducing rotor blade vibration, the linear positioner including:
   a brushless DC motor having a motor shaft; and
   an output piston extending transversely to the motor shaft; and
   a planetary roller nut operably connected to the motor via a non back driving reduction gear;

the output piston operably connected to the planetary roller nut via a screw shaft to transform rotary motion of the roller nut into linear motion on the output piston; and a plurality of rolling elements disposed in the linear positioner between the screw shaft and the planetary roller nut.

2. The rotor blade assembly of claim 1, wherein the trim tab is disposed at a trailing edge of the rotor blade.

3. The rotor blade assembly of claim 1, wherein the linear positioner is operably connected to an electronic control system.

4. The rotor blade assembly of claim 1, wherein the plurality of rolling elements are formed from a self-lubricating material.

5. The rotor blade assembly of claim 1, wherein at least one of the plurality of rolling elements, the planetary roller nut and the screw shaft are dry lubricant coated.

6. The rotor blade assembly of claim 1, wherein the output piston of the linear positioner extends in a chordwise direction.

7. A rotary-winged aircraft comprising:
an airframe; and
a main rotor assembly operably connected to the airframe including a plurality of rotor blade assemblies rotatable about a rotor assembly axis, at least one rotor blade assembly of the plurality of rotor blade assemblies including:
a rotor blade;
a movable trim tab disposed along a span of the rotor blade; and
a linear positioner disposed inside the rotor blade and operably connected to the trim tab to move the trim tab thereby reducing rotor blade vibration, the linear positioner including:
a brushless DC motor having a motor shaft; and
an output piston extending transversely to the motor shaft; and
a planetary roller nut operably connected to the motor via a non back driving reduction gear;
the output piston operably connected to the planetary roller nut via a screw shaft to transform rotary motion of the roller nut into linear motion on the output piston; and
a plurality of rolling elements disposed in the linear positioner between the screw shaft and the planetary roller nut.

8. The rotary-winged aircraft of claim 7, wherein the plurality of rolling elements are formed from a self-lubricating material.

9. The rotary-winged aircraft of claim 7, wherein at least one of the plurality of rolling elements, the planetary roller nut and the screw shaft are dry lubricant coated.

10. The rotary-winged aircraft of claim 7, wherein the output piston of the linear positioner extends in a chordwise direction.

11. A method for reducing vibration of a rotor assembly comprising:
energizing a linear positioner disposed inside a rotor blade of the rotor assembly;
moving an output piston of the linear positioner;
moving a trim tab disposed at the rotor blade to a selected trim tab angle relative to the rotor blade by the output piston motion; and
deenergizing the linear positioner thereby locking the trim tab at the selected trim tab angle;
wherein moving the output piston of the linear positioner includes:
rotating a motor shaft of a brushless DC motor, the motor shaft positioned transversely to the output piston;
transferring rotational energy from the motor shaft to a planetary roller nut via a reduction gear; and
transforming rotational motion of the planetary roller nut into linear motion of the output piston via a screw shaft operably connected to the planetary roller nut and the output piston.

12. The method of claim 11, wherein linear motion of the output piston urges rotation of the trim tab about a pivot axis.

\* \* \* \* \*